March 25, 1930.  F. W. MILLER  1,751,489
METHOD OF MAKING BI-METALLIC STRIPS FOR THERMOSTATS
Filed April 6, 1927
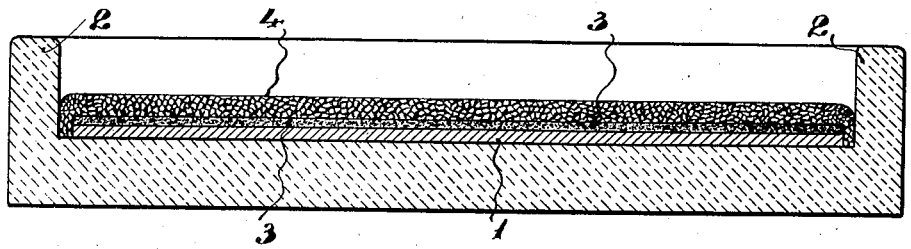
INVENTOR
FREDERICK W. MILLER
By
Attorneys Patented Mar. 25, 1930

1,751,489

UNITED STATES PATENT OFFICE

FREDERICK WILLIAM MILLER, OF HOCKLEY HEATH, ENGLAND

METHOD OF MAKING BIMETALLIC STRIPS FOR THERMOSTATS

Application filed April 6, 1927, Serial No. 181,407, and in Great Britain April 21, 1926.

This invention relates to the manufacture of bi-metallic or compound strips or plates for thermostats, comprising superimposed metallic plates or layers having different coefficients of expansion, and secured or united together so that the compound strip or plate is caused to alter its shape, or to assume a curved or bowed form, when subjected to a change of temperature.

The object of the present invention is to provide an improved process for preventing oxidation of the opposed surfaces of the two metals which are to be joined, and for ensuring a better and more intimate connection between them.

According to the invention, the metal plate of higher melting point is first covered with a flux mixed with finely-divided or granular metal of lower melting point, and then another layer of the said metal of lower melting point (without flux) is applied over the surface of the mixture of granulated metal and flux, the whole being subjected to heat in order to fuse the granulated metal onto the plate. A flux consisting of powdered fused borax is preferably employed the flux being first mixed with the metal to be fused, which is in a finely divided or granulated form, and the mixture spread evenly over the surface of the other metal. A coarsely granulated layer of the metal to be fused is then applied and the whole subjected to the action of heat. The adhesion between the two metals may be increased by subjecting the surface of the harder metal to the action of acid for a sufficient length of time to impart to the metal a grained or undercut surface.

The accompanying drawing represents a sectional view through the crucible containing the two metals, with the flux between them, prior to being subjected to the heating operation.

Thus, in carrying out the invention, the bi-metallic or compound thermostatic material is composed of two metals having different coefficients of expansion, namely nickel-steel and brass, the two metals being subjected to the action of heat so that the brass is fused onto the nickel-steel and is caused closely to adhere thereto. For this purpose a plate 1 of nickel-steel is placed upon the bottom of a crucible or fire-clay dish 2, as shown in the drawing, the bottom of the latter being slightly larger than the said plate to allow for expansion. A flux consisting of powdered fused borax is then mixed with high quality fine grain brass, and the mixture 3 thus obtained is applied to the upper face of the plate 1 so as entirely to cover the latter. A layer 4 of high quality coarse grain brass of any suitable depth, is then applied so as to cover the flux-mixture 3, as shown. The crucible 2 is then placed within a muffle-furnace, and its contents are brought up to a temperature which is sufficiently high to fuse the brass without fusing the nickel-steel which has a higher melting point. After cooling it will be found that the brass has closely and intimately united with or adhered to the nickel-steel, giving a perfectly close joint between the two metals and permitting of the thermostatic material or bi-metallic plate being rolled out to the required thickness without the two metals separating. After rolling the plates may be cut into strips of the desired size. Instead of a layer of coarse grain brass being employed a brass plate of a suitable thickness may be laid over the coating of flux and finely granulated brass upon the nickel-steel plate, heat being applied to fuse the brass plate in a similar manner.

Any suitable metals having different coefficients of expansion and which will adhere to one another may be employed in lieu of brass and nickel-steel, if desired. Further, any suitable flux may be used.

Even greater coherence between the two metals may be obtained by well cleaning the surface of the nickel-steel, or other metal, and then treating it with acid for a sufficient length of time to leave a grained and slightly undercut surface, so that the brass, or the metal which is fused, obtains a better and more intimate adhesion. This method serves to unite or join the two metals together in a manner which is superior to welding. This operation may be accelerated by mixing sulphuric and nitric acid with a small percentage of bi-chromate of potash.

Having fully described my invention, what

I desire to claim and secure by Letters Patent is:—

1. The process of making bi-metallic strips or plates for thermostats consisting in placing a metal plate in a crucible, covering the entire upper surface of the plate with a layer composed of a flux mixed with a metal having a lower melting point than the metal of the plate, such metal of lower melting point being in granular form, applying to the entire upper surface of the mixture a top layer composed solely of the said metal of lower melting point, subjecting the whole to the action of heat so that the metal of the intermediate and top layers fuses and displaces the flux so as to unite with the bottom plate in order to produce a bi-metallic slab of substantial thickness, and finally subjecting the slab thus produced to a rolling process to form a plate of thermostatic metal of the desired gauge.

2. The process of making bi-metallic strips or plates for thermostats consisting in placing a plate of nickel-steel in a crucible, covering the entire upper surface of the plate with a layer composed of borax mixed with finely granulated brass, applying to the entire upper surface of the mixture a top layer composed solely of coarsely-granulated brass, subjecting the whole to the action of heat so that the brass fuses and displaces the flux so as to unite with the nickel-steel bottom plate in order to produce a bi-metallic slab of substantial thickness, and finally subjecting the said slab to a rolling process to form a plate of thermostatic metal of the desired gauge.

3. The process of making bi-metallic strips or plates for thermostats consisting in treating one face of a metal plate with acid for a sufficient length of time to form a grained undercut surface, placing the said plate in a crucible with the acid-treated face uppermost, covering the entire upper surface of the plate with a layer composed of a flux mixed with a metal having a lower melting point than the metal of the plate, such metal of lower melting point being in granular form, applying to the entire upper surface of the mixture a top layer composed solely of the said metal of lower melting point, subjecting the whole to the action of heat so that the metal of the intermediate and top layers fuses and displaces the flux so as to unite with the bottom plate in order to produce a bi-metallic slab of substantial thickness, and finally subjecting the slab thus produced to a rolling process to form a plate of thermostatic metal of the desired gauge.

4. The process of making bi-metallic strips or plates for thermostats consisting in treating one face of a metal plate with a mixture of sulphuric and nitric acids containing a small percentage of bichromate of potash for a sufficient time to form a grained undercut surface, placing the said plate in a crucible with the acid-treated face uppermost, covering the entire upper surface of the plate with a layer composed of a flux mixed with a metal having a lower melting point than the metal of the plate, such metal of lower melting point being in granular form, applying to the entire upper surface of the mixture a top layer composed solely of the said metal of lower melting point, subjecting the whole to the action of heat so that the metal of the intermediate and top layers fuses and displaces the flux so as to unite with the bottom plate in order to produce a bi-metallic slab of substantial thickness, and finally subjecting the slab thus produced to a rolling process to form a plate of thermostatic metal of the desired gauge.

5. The process of making a bi-metallic slab which consists in placing a plate having a high melting point in a crucible, spreading over the entire surface of said plate a mixture of fine granular metal of a lower melting point and a flux, covering the entire upper surface of said mixture with a top layer of such metal of lower melting point, and subjecting the whole to the action of heat so that the metal of said mixture and top layer fuses and displaces said flux and unites with the first named plate to produce a bi-metallic slab.

In testimony whereof I have hereunto set my hand.

FREDERICK WILLIAM MILLER.